United States Patent
Choi et al.

(10) Patent No.: US 9,817,652 B2
(45) Date of Patent: Nov. 14, 2017

(54) DATA STORAGE DEVICE AND METHOD FOR REDUCING FIRMWARE UPDATE TIME AND DATA PROCESSING SYSTEM INCLUDING THE DEVICE

(71) Applicants: Sang Hoon Choi, Seoul (KR); Sung Chul Kim, Hwaseong-si (KR); Hyun Koo Kim, Anyang-si (KR); Chan Ik Park, Suwon-si (KR); Han Deok Lee, Seongnam-si (KR)

(72) Inventors: Sang Hoon Choi, Seoul (KR); Sung Chul Kim, Hwaseong-si (KR); Hyun Koo Kim, Anyang-si (KR); Chan Ik Park, Suwon-si (KR); Han Deok Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/865,415

(22) Filed: Sep. 25, 2015

(65) Prior Publication Data
US 2016/0124740 A1    May 5, 2016

(30) Foreign Application Priority Data
Oct. 30, 2014  (KR) ........................ 10-2014-0149459

(51) Int. Cl.
*G06F 9/44*     (2006.01)
*G06F 9/445*    (2006.01)

(52) U.S. Cl.
CPC ..................................... *G06F 8/65* (2013.01)

(58) Field of Classification Search
CPC ................................................ G06F 8/65–8/67
See application file for complete search history.

(56) References Cited

U.S. PATENT DOCUMENTS

| | | | | |
|---|---|---|---|---|
| 5,579,522 A | * | 11/1996 | Christeson | G06F 8/65 713/2 |
| 6,237,091 B1 | * | 5/2001 | Firooz | G06F 8/65 709/222 |
| 7,039,799 B2 | * | 5/2006 | Smith | G06F 13/385 713/100 |

(Continued)

FOREIGN PATENT DOCUMENTS

| | | |
|---|---|---|
| JP | 2008077474 A | 4/2008 |
| JP | 2008102761 A | 5/2008 |

(Continued)

*Primary Examiner* — Tuan Q. Dam
*Assistant Examiner* — Zheng Wei
(74) *Attorney, Agent, or Firm* — Volentine & Whitt, PLLC

(57) ABSTRACT

A data storage device for reducing a firmware update time includes a non-volatile memory configured to store a firmware update image which will replace a current firmware image, a first volatile memory, and a processor configured to control an operation of the non-volatile memory and an operation of the first volatile memory. When a first code included in the current firmware image is executed by the processor, the first code generates data necessary for an operation of the data storage device and stores the data in the first volatile memory. When a second code included in the firmware update image is executed by the first code, the second code accesses and uses the data that has been stored in the first volatile memory.

17 Claims, 9 Drawing Sheets

(56) References Cited

U.S. PATENT DOCUMENTS

| | | | |
|---|---|---|---|
| 7,089,547 B2* | 8/2006 | Goodman | G06F 8/65 713/1 |
| 7,089,550 B2* | 8/2006 | Bakke | G06F 8/67 717/173 |
| 7,222,338 B2* | 5/2007 | Bae | G06F 8/65 717/168 |
| 7,480,904 B2 | 1/2009 | Hsu et al. | |
| 7,500,235 B2* | 3/2009 | Maynard | H04N 21/26291 717/171 |
| 7,543,118 B1* | 6/2009 | Chen | G06F 8/65 711/154 |
| 7,657,886 B1* | 2/2010 | Chen | G06F 8/65 711/202 |
| 8,185,886 B2 | 5/2012 | Rothman et al. | |
| 8,214,653 B1* | 7/2012 | Marr | G06F 21/572 380/286 |
| 8,245,214 B2 | 8/2012 | Long et al. | |
| 8,468,516 B1* | 6/2013 | Chen | G06F 8/67 707/687 |
| 8,549,510 B2 | 10/2013 | Ohama et al. | |
| 8,694,984 B2 | 4/2014 | Chang | |
| 8,887,144 B1* | 11/2014 | Marr | G06F 8/65 713/2 |
| 2002/0124243 A1* | 9/2002 | Broeksteeg | G06F 8/65 717/168 |
| 2003/0177486 A1* | 9/2003 | Bakke | G06F 8/67 717/169 |
| 2004/0054883 A1* | 3/2004 | Goodman | G06F 8/65 713/1 |
| 2004/0205779 A1* | 10/2004 | Almeida | G06F 8/65 719/321 |
| 2005/0170827 A1* | 8/2005 | Nagashima | G06F 8/65 455/419 |
| 2005/0188366 A1* | 8/2005 | Chang | G06F 8/665 717/168 |
| 2005/0223372 A1* | 10/2005 | Borchers | G06F 8/65 717/168 |
| 2006/0015861 A1* | 1/2006 | Takata | G06F 8/67 717/168 |
| 2006/0259902 A1* | 11/2006 | Lin | G06F 8/65 717/168 |
| 2007/0074201 A1* | 3/2007 | Lee | G06F 8/65 717/173 |
| 2008/0155524 A1* | 6/2008 | Shone | G06F 8/65 717/168 |
| 2008/0162787 A1 | 7/2008 | Tomlin et al. | |
| 2009/0187900 A1* | 7/2009 | Nakamoto | G06F 8/65 717/168 |
| 2009/0271533 A1 | 10/2009 | Asnaashari | |
| 2010/0153468 A1* | 6/2010 | Lange | G06F 9/44505 707/802 |
| 2010/0325622 A1* | 12/2010 | Morton | G06F 8/68 717/168 |
| 2012/0110562 A1* | 5/2012 | Heinrich | G06F 8/65 717/169 |
| 2012/0117555 A1* | 5/2012 | Banerjee | G06F 8/65 717/168 |
| 2012/0246442 A1* | 9/2012 | Dolgunov | G06F 8/67 711/209 |
| 2014/0189673 A1 | 7/2014 | Stenfort et al. | |
| 2014/0201727 A1 | 7/2014 | Asselin et al. | |
| 2015/0149989 A1* | 5/2015 | Lu | G06F 8/65 717/170 |

FOREIGN PATENT DOCUMENTS

| | | |
|---|---|---|
| JP | 2012194793 A | 10/2012 |
| KR | 0927446 | 11/2009 |

* cited by examiner

DATA STORAGE DEVICE AND METHOD FOR REDUCING FIRMWARE UPDATE TIME AND DATA PROCESSING SYSTEM INCLUDING THE DEVICE

CROSS-REFERENCE TO RELATED APPLICATION

This application claims priority under 35 U.S.C. §119(a) from Korean Patent Application No. 10-2014-0149459 filed on Oct. 30, 2014, the disclosure of which is hereby incorporated by reference in its entirety.

BACKGROUND

Embodiments of the application relate to a data storage device, and more particularly, to a data storage device and method for reducing a firmware update time and a data processing system including the device.

A computing device may update old firmware with new firmware. In an example of the firmware update, when old firmware is updated with new firmware in a computing device, the computing device cuts off and then resumes power supply. In another example, when old firmware is updated with new firmware in a computing device, a code of the old firmware migrates or flushes data from a cache to another memory and writes metadata generated by the code and stored in volatile memory to non-volatile memory; and a code of the new firmware reads the metadata from the non-volatile memory and loads it to the volatile memory. In the time necessary for the firmware update, the time taken to write the metadata stored in the volatile memory to the non-volatile memory and the time taken to load the metadata from the non-volatile memory to the volatile memory are significantly long.

Moreover, as the capacity of volatile and non-volatile memory in a computing system increases and the size of metadata stored in the volatile memory increases, the time taken to write the metadata stored in the volatile memory to the non-volatile memory and the time taken to load the metadata from the non-volatile memory to the volatile memory also increase. As a result, the time necessary for the firmware update also increases. When the time necessary for the firmware update increases, a user needs to wait for the firmware update to finish for an increasing amount of time.

SUMMARY

According to some embodiments of the application, there is provided a data storage device including a non-volatile memory configured to store a firmware update image which will replace a current firmware image, a first volatile memory, and a processor configured to control an operation of the non-volatile memory and an operation of the first volatile memory.

When a first code included in the current firmware image is executed by the processor, the first code may generate data necessary for an operation of the data storage device and may store the data in the first volatile memory. When a second code included in the firmware update image is executed by the first code, the second code may access and use the data that has been stored in the first volatile memory.

The data may include at least one type of data among mapping data for mapping a logical address to a physical address and data about an error occurring during an access operation of the non-volatile memory. The first code may transmit the data stored in the first volatile memory to the non-volatile memory. Alternatively, the first code may not transmit the data stored in the first volatile memory to the non-volatile memory.

The first code may store the firmware update image in the non-volatile memory to update the current firmware image with the firmware update image. The first code may store the firmware update image in a second volatile memory and when the second code stored in the second volatile memory is executed by the first code, the second code may store the firmware update image, which has been stored in the second volatile memory, in the non-volatile memory to update the current firmware image with the firmware update image.

When the firmware update image is received, the first code may generate context information and may store the context information in the first volatile memory and the second code may access the data stored in the first volatile memory using the context information stored in the first volatile memory and may use the data. The context information may include a first meta version of the current firmware image. A physical address of a memory region storing the data in the first volatile memory may be included in the context information, the second code, or second data accessed by the second code.

The second code may compare the first meta version of the current firmware image with a second meta version of the firmware update image. When the first meta version agrees with the second meta version, the second code may access the data stored in the memory region using the physical address and may use the data.

Alternatively, when the firmware update image is received, the first code may generate context information and may store the context information in the non-volatile memory and the second code may load the context information from the non-volatile memory to the first volatile memory, may access the data using the context information, and may use the data. The context information may include a first meta version of the current firmware image. A physical address of a memory region storing the data in the first volatile memory may be included in the context information, the second code, or second data accessed by the second code.

The second code may compare the first meta version of the current firmware image with a second meta version of the firmware update image. When the first meta version agrees with the second meta version, the second code may access the data stored in the memory region using the physical address and may use the data.

According to other embodiments of the application, there is provided a data processing system including a data storage device, a host configured to transmit a firmware update image to the data storage device, and an interface connected between the data storage device and the host.

The data storage device may include a non-volatile memory configured to store a firmware update image which will replace a current firmware image, a first volatile memory, and a processor configured to control an operation of the non-volatile memory and an operation of the first volatile memory. When a first code included in the current firmware image is executed by the processor, the first code may generate data necessary for an operation of the data storage device and may store the data in the first volatile memory. When a second code included in the firmware update image is executed by the first code, the second code may access and use the data that has been stored in the first volatile memory. The interface may be a serial advanced technology attachment (SATA) interface, a SATA express (SATAe) interface, a serial attached small computer system interface (SCSI) (SAS) interface, a non-volatile memory express (NVMe) interface, or a peripheral component interconnect express (PCIe) interface.

According to further embodiments of the application, there is provided a method of updating firmware in a data storage device. The method includes generating data necessary for an operation of the data storage device and storing the data in a first volatile memory, using a first code included in a current firmware image being executed in the data storage device; receiving a firmware update image; updating the current firmware image with the firmware update image; accessing the data stored in the first volatile memory using a second code included in the firmware update image when the second code is executed by the first code; and controlling the operation of the data storage device using the data accessed by the second code.

The updating may include storing the firmware update image, which has been received, in a non-volatile memory using the first code to enable the current firmware image to be updated with the firmware update image. Alternatively, the updating may include storing the firmware update image in a second volatile memory using the first code; and storing the firmware update image, which has been stored in the second volatile memory, in a non-volatile memory using the second code executed by the first code.

According to further embodiments of the application, there is provided a method, executed by a processor, of updating firmware in a data storage device. The method includes generating, by execution of first program instruction of a current firmware image, data for operation of the data storage device and storing the data in a volatile memory; updating the current firmware image with an update firmware image; and accessing, by execution of second program instruction of the update firmware image, the data stored in the volatile memory.

In an embodiment, the data for operation of the data storage device maps a logical memory address to a physical memory address. In an embodiment, the data for operation of the data storage device is information of an error occurring in a non-volatile memory access by the processor.

The method may further include generating, by execution of the first program instruction, a first meta version of the current firmware image, and determining whether the second program instruction may access the data based upon an outcome of comparing the first meta version and a second meta version of the update firmware image.

In an embodiment, the determination is made by execution of the second program instruction.

In an embodiment, the first meta version comprises information of a metadata structure. In an embodiment, the processor acquires the first meta version from the volatile memory by execution of the second program instruction. In an embodiment, the second program instruction causes the processor to acquire the first meta version from a nonvolatile memory.

The method may further include accessing the data while updating the current firmware image with the update firmware image. The data for operation of the data storage device is information of an error occurring in a non-volatile memory access by the processor or maps a logical memory address to a physical memory address.

In an embodiment, the first program instruction updates the current firmware image with the update firmware image. In an embodiment, the second program instruction updates the current firmware image with the update firmware image.

According to further embodiments of the application, there is provided a data storage device having a processor that generates data for operation of the data storage device by execution of first program instruction of a current firmware image; a volatile memory that stores the data; and a nonvolatile memory in which the current firmware image is updated with an update firmware image. The processor accesses, by execution of second program instruction of the update firmware image, the data stored in the volatile memory.

In an embodiment, the processor accesses the data stored in the volatile memory while the current firmware image is updated with the update firmware image, and the data for operation of the data storage device is information of an error occurring during a non-volatile memory access by the processor or maps a logical memory address to a physical memory address.

BRIEF DESCRIPTION OF THE DRAWINGS

The above and other features and advantages of the application will become more apparent by describing in detail exemplary embodiments thereof with reference to the attached drawings in which.

DETAILED DESCRIPTION OF THE EMBODIMENTS

Figure 1:
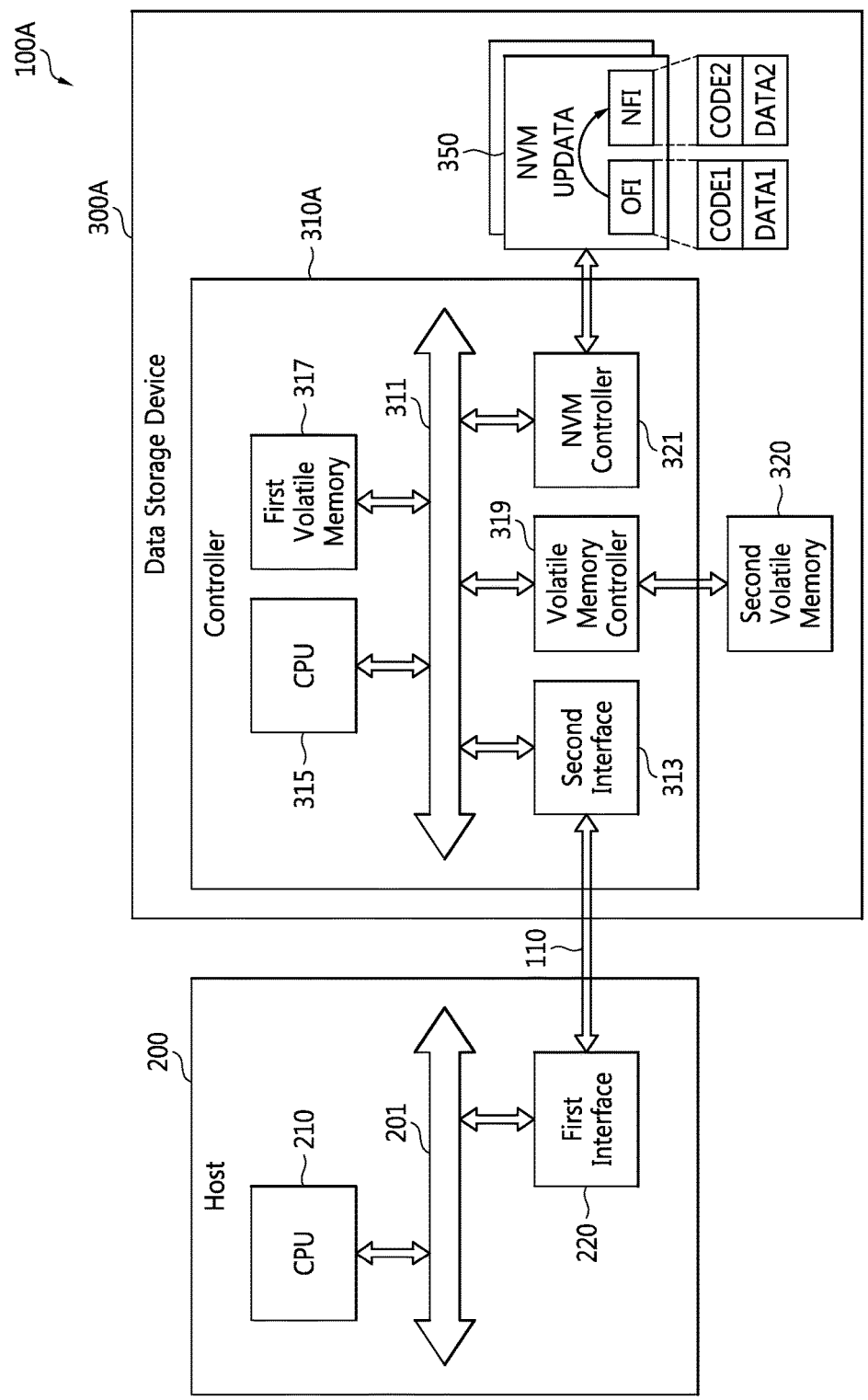
FIG. 1 is a block diagram of a data processing system according to some embodiments of the application.

The application now will be described more fully hereinafter with reference to the accompanying drawings, in which embodiments of the application are shown. This application may, however, be embodied in many different forms and should not be construed as limited to the embodiments set forth herein. Rather, these embodiments are provided so that this disclosure will be thorough and complete, and will fully convey the scope of the application to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100A according to some embodiments of the application. The data processing system 100A may include a host 200 and a data storage device 300A, which are connected with each other via an interface 110.

Each of data processing systems 100A and 100B, which will be described hereinafter, may be implemented as a server computer, a personal computer (PC), a desktop computer, a laptop computer, a workstation computer, a network-attached storage (NAS), a data center, an internet data center (IDC), or a mobile computing device. The mobile computing device may be a smart phone, a tablet PC, or a mobile internet device (MID).

The host 200 may control a data processing operation (e.g., a write or read operation) of the data storage device 300A. The host 200 may also transmit a request to update a current firmware image OFI installed in the data storage device 300A and a firmware update image NFI to the data storage device 300A through the interface 110. The current firmware image OH may be an old firmware image or a current firmware binary image. The firmware update image NFI may be a new firmware image or a new firmware binary image.

The host 200 may include a central processing unit (CPU) 210 and a first interface 220. The block diagram of the host 200 illustrated in FIG. 1 is just an example and the application is not restricted thereto. The host 200 may also include other components apart from the CPU 210 and the first interface 220.

The host 200 may be implemented in an integrated circuit (IC), a mother board, or a system on chip (SoC), but the application is not restricted to these examples. The host may be implemented as an application processor (AP) or a mobile AP in other embodiments.

The CPU 210 may transmit and receive commands and/or data to and from the first interface 220 via bus architecture 201. The bus architecture 201 may be an advanced microcontroller bus architecture (AMBA), advanced extensible interface (AXI), advanced peripheral bus (APB), or advanced high-performance bus (AHB), but the application is not restricted to these examples.

The CPU 210 may transmit a request to update the current firmware image OFI installed in the data storage device 300A and the firmware update image NFI to the data storage device 300A through the interfaces 220 and 110. The CPU 210 may be a processor which can execute a program or programs for executing operations according to the current embodiments of the application.

The first interface 220 may be connected with a second interface 313 of the data storage device 300A via the interface 110. The interfaces 110, 220, and 313 may support a peripheral component interconnect express (PCIe) protocol, a serial advanced technology attachment (SATA) protocol, a SATA express (SATAe) protocol, a SAS (serial attached small computer system interface (SCSI)) protocol, or a non-volatile memory express (NVMe) protocol, but the application is not restricted to these examples.

The data storage device 300A may include a controller 310A, a second volatile memory 320, and a non-volatile memory (NVM) 350. The data storage device 300A may be implemented as a flash-based memory device, but the application is not restricted to this example. The data storage device 300A may be implemented as a solid-state drive or solid-state disk (SSD), a universal flash storage (UFS), a multimedia card (MMC), or an embedded MMC (eMMC). Alternatively, the data storage device 300A may be implemented as a hard disk drive (HDD). The data storage device 300A may be attached to or detached from the host 200. The data storage device 300A may have a form of a memory module.

In a method of updating firmware in the data storage device 300A, data necessary for the operations of the data storage device 300A is generated using a first code CODE1 included (or contained) in the current firmware image OFI currently being executed in the data storage device 300A, the data is stored in a volatile memory 317 or 320, the firmware update image NFI is received from the host 200, the current firmware image OFI is updated (or replaced) with the firmware update image NFI, a second code CODE2 accesses the data in the volatile memory 317 or 320 when the second code CODE2 included (or contained) in the firmware update image NFI is executed by the first code CODE1, and the second code CODE2 controls the operations of the data storage device 300A using the accessed data. In other words, the data generated by the first code CODE1 and stored in the first volatile memory 317 may be accessed and used by the second code CODE2 executed by the first code CODE1.

The controller 310A may control a transfer of commands and/or data among the host 200, the second volatile memory 320, and the NVM 350. The controller 310A may include the second interface 313, a CPU 315, the first volatile memory 317, a volatile memory controller 319, and an NVM controller 321. The second interface 313 may be connected with the first interface 220 of the host 200 via the interface 110.

The CPU 315 may control the operations of the second interface 313, the first volatile memory 317, the volatile memory controller 319, and the NVM controller 321 via bus architecture 311. The CPU 315 may be a processor which can execute a program or programs for executing operations according to the current embodiments of the application.

The programs may involve the first code CODE1 included in the current firmware image OFI and the second code CODE2 included in the firmware update image NFI.

The second interface 313, the CPU 315, the first volatile memory 317, the volatile memory controller 319, and the NVM controller 321 may communicate commands and/or data with one another through the bus architecture 311. The bus architecture 311 may be AMBA, AXI, APB, or AHB, but the application is not restricted to these examples.

The first volatile memory 317 may store data, e.g., mapping data for mapping a logical address to a physical address and/or data about an error (or positions of memory cells causing the error) occurring in an access operation (such as a write (or program) operation or a read operation) on the NVM 350 according to the control of the first code CODE1 contained in the current firmware image OH.

The first code CODE1 may include instructions that can be executed by the CPU 315. The first code CODE1 may generate data i.e., metadata such as mapping data for the operations of the data storage device 300A and/or data about an error and may store the data in the first volatile memory 317.

The first volatile memory 317 may be static random access memory (SRAM), cache, or tightly coupled memory (TCM), but the application is not restricted to these examples. The first volatile memory 317 is positioned outside the CPU 315 in the embodiments illustrated in FIG. 1, but the application is not restricted to the current embodiment. The first volatile memory 317 may be positioned inside the CPU 315 in other embodiments.

The volatile memory controller 319 may write data (or firmware update image) to or read data (or firmware update image) from the second volatile memory 320 according to the control of the first code CODE1 contained in the current firmware image OH or the control of the second code CODE2 contained in the firmware update image NFI.

The second volatile memory 320 may be dynamic random access memory (DRAM), but the application is not restricted to this example. The first volatile memory 317 and the second volatile memory 320 are separated from each other in the embodiments illustrated in FIG. 1, but the first volatile memory 317 and the second volatile memory 320 may be integrated into one memory in other embodiments. At this time, the first volatile memory 317 may be part of the second volatile memory 320.

Although the volatile memory controller 319 controls the operations of the second volatile memory 320 in the embodiments illustrated in FIG. 1, the volatile memory controller 319 may control the operations of at least one of the first volatile memory 317 and the second volatile memory 320. For example, when the first volatile memory 317 and the second volatile memory 320 are formed with different types of memory, the volatile memory controller 319 may control the operations of at least one of the first volatile memory 317 and the second volatile memory 320 using a different control scheme. Although the second volatile memory 320 is positioned outside the controller 310A in the embodiments illustrated in FIG. 1, the second volatile memory 320 may be positioned inside the controller 310A in other embodiments.

The NVM controller 321 may write data (or the firmware update image NFI) to or read data (or the firmware update image NFI) from the NVM 350 according to the first or second code CODE1 or CODE2 executed by the CPU 315. The NVM 350 may be implemented as flash-based memory, but the application is not restricted to this example. The flash-based memory may be NAND or NOR type flash memory. The flash-based memory may include a plurality of memory cells and an access control circuit which controls an access operation (e.g., a program operation or a read operation) on the memory cells. Each of the memory cells may store information of one bit or more.

The NVM 350 may be implemented as electrically erasable programmable read-only memory (EEPROM), magnetic RAM (MRAM), spin-transfer torque MRAM, ferroelectric RAM (FRAM), phase-change RAM (PRAM), resistive RAM (RRAM), nanotube RRAM, polymer RAM (PoRAM), nano floating gate memory (NFGM), holographic memory, molecular electronics memory device, or insulator resistance change memory.

The NVM 350 may store the current firmware image OFI. When a firmware update is performed, the current firmware image OFI may be updated with the firmware update image NFI. The current firmware image OFI may include the first code CODE1 and first data DATA1. The first code CODE1 may include a program code or instructions that can be executed by the CPU 315. The first data DATA1 may be data that is accessed or used by the first code CODE1. The first code CODE1 and/or the first data DATA1 may be updated in the first volatile memory 317 and/or the second volatile memory 320 according to the control of the CPU 315.

The firmware update image NFI may include the second code CODE2 and second data DATA2. The second code CODE2 may include a program code or instructions that can be executed by the CPU 315. The second data DATA2 may be data that is accessed or used by the second code CODE2. During a firmware update, the second code CODE2 and/or the second data DATA2 may be updated in the first volatile memory 317 and/or the second volatile memory 320 according to the control of the CPU 315.

In a firmware update, the first code CODE1 may jump to the second code CODE2 or the second code CODE2 may be executed by the first code CODE1. A method of executing the second code CODE2 using the first code CODE1 may be modified in various ways.

Figure 2:
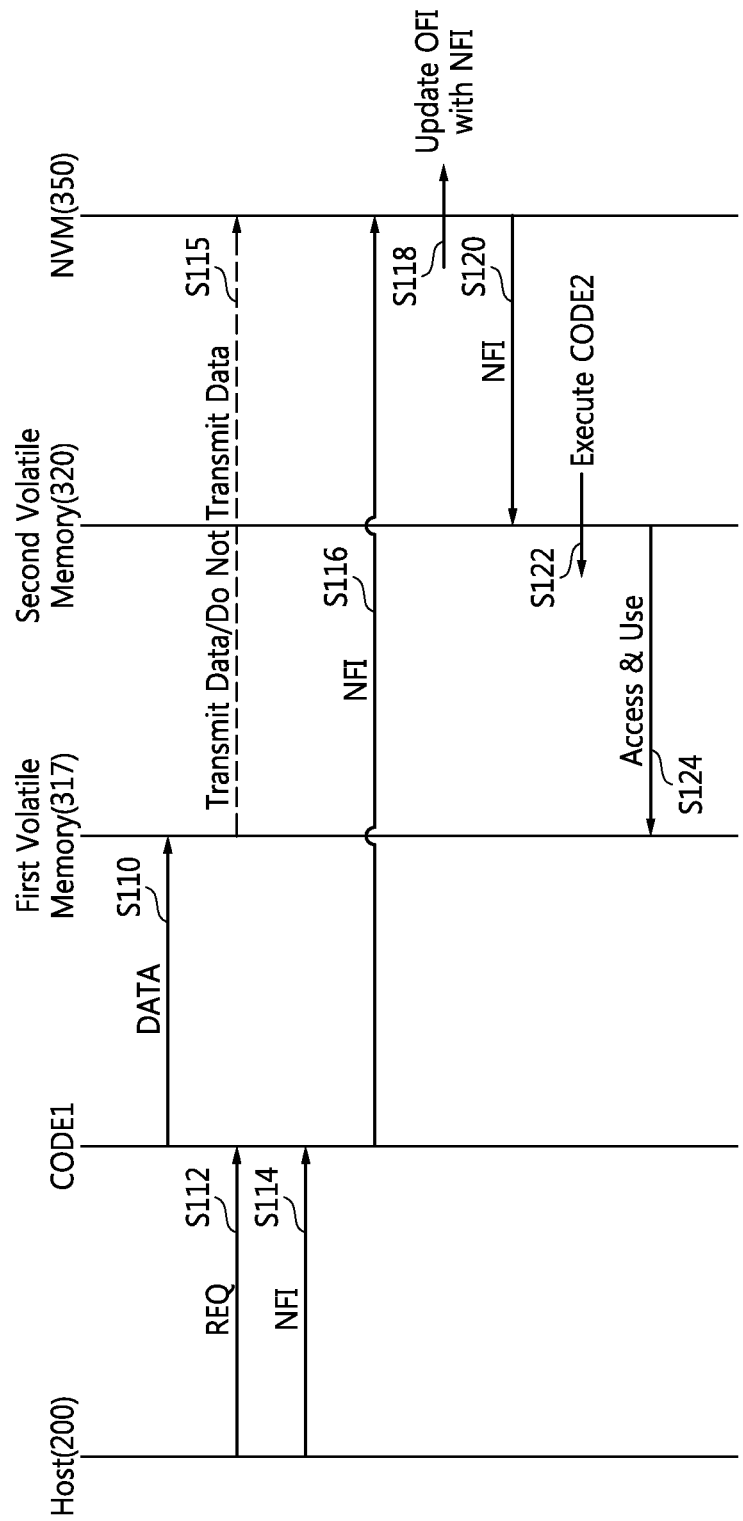
FIG. 2 is a conceptual diagram of a firmware update of a data storage device illustrated in FIG. 1 according to some embodiments of the application.

FIG. 2 is a conceptual diagram of a firmware update of the data storage device 300A illustrated in FIG. 1 according to some embodiments of the application. Referring to FIGS. 1 and 2, the current firmware image OFI may be installed in the NVM 350 and the first code CODE1 in the current firmware image OFI may be loaded to the volatile memory 317 or 320 to be executed.

The first code CODE1 executed by the CPU 315 may generate data necessary for the operations of the data storage device 300A and the data may be stored in the first volatile memory 317 in operation S110. The data generated by the first code CODE1 may be mapping data for mapping a logical address to a physical address and/or data about an error occurring during an access operation on the NVM 350, but the application is not restricted to the current embodiments.

The first code CODE1 executed by the CPU 315 may receive a request REQ to update firmware from the host 200 through the second interface 313 in operation S112. For example, when a user inputs a command to update firmware into the host 200, the CPU 210 may generate the request REQ. The request REQ may be transmitted to the CPU 315 through the interfaces 220, 110, and 313. The CPU 315 may prepare for a firmware update in response to the request REQ.

The data storage device 300A may receive the firmware update image NFI from the host 200 through the interface 110 in operation S114. Operations S112 and S114 may be performed using firmware over-the-air (FOTA), but the application is not restricted to this example. The data stored in the first volatile memory 317 may or may not be transmitted to the NVM 350 through the NVM controller 321 according to the control of the first code CODE1 executed by the CPU 315 in operation S115.

According to the control of the first code CODE1 executed by the CPU 315, the NVM controller 321 may store the firmware update image NFI transmitted from the host 200 in the NVM 350 in operation S116. According to the control of the NVM controller 321, the current firmware image OFI stored in the NVM 350 may be updated or replaced with the firmware update image NFI in operation S118.

The updated firmware update image NFI may be loaded to the second volatile memory 320 by a bootloader executed by the first code CODE1 in operation S120. Although the updated firmware update image NFI is loaded to the second volatile memory 320 in the embodiments illustrated in FIG. 2, the updated firmware update image NFI may be loaded to the first volatile memory 317 by the bootloader in operation S120 in other embodiments. The bootloader may be stored in the volatile memory 317 or 320 or the NVM 350 and executed by the first code CODE1.

The second code CODE2 included in the firmware update image NFI loaded to the volatile memory 317 or 320 may be executed by the first code CODE1 in operation S122. The second code CODE2 executed by the first code CODE1 may access and use the data stored in the first volatile memory 317 in operation S124. Various methods may be used to access the first volatile memory 317 using the second code CODE2. One of these methods will be described with reference to FIGS. 4 through 7. For example, the second code CODE2 or the second data DATA2 accessed by the second code CODE2 may include an address (e.g., a physical address) used to access the data stored in the first volatile memory 317. Accordingly, the second code CODE2 executed by the first code CODE1 may access the data stored in the first volatile memory 317 using the address.

The data storage device 300A described with reference to FIG. 2 may omit an operation of writing the data stored in the first volatile memory 317 to the NVM 350 and an operation of loading the data from the NVM 350 to the first volatile memory 317 during the firmware update, thereby decreasing a firmware update time. When the firmware update time is decreased, a user is allowed to continuously use the data storage device 300A longer for the amount of time corresponding to the decrease in the firmware update time.

According to the embodiments illustrated in FIG. 2, the data storage device 300A may directly store the firmware update image NFI transmitted from the host 200 in the NVM 350 according to the control of the first code CODE1 executed by the CPU 315.

Figure 3:
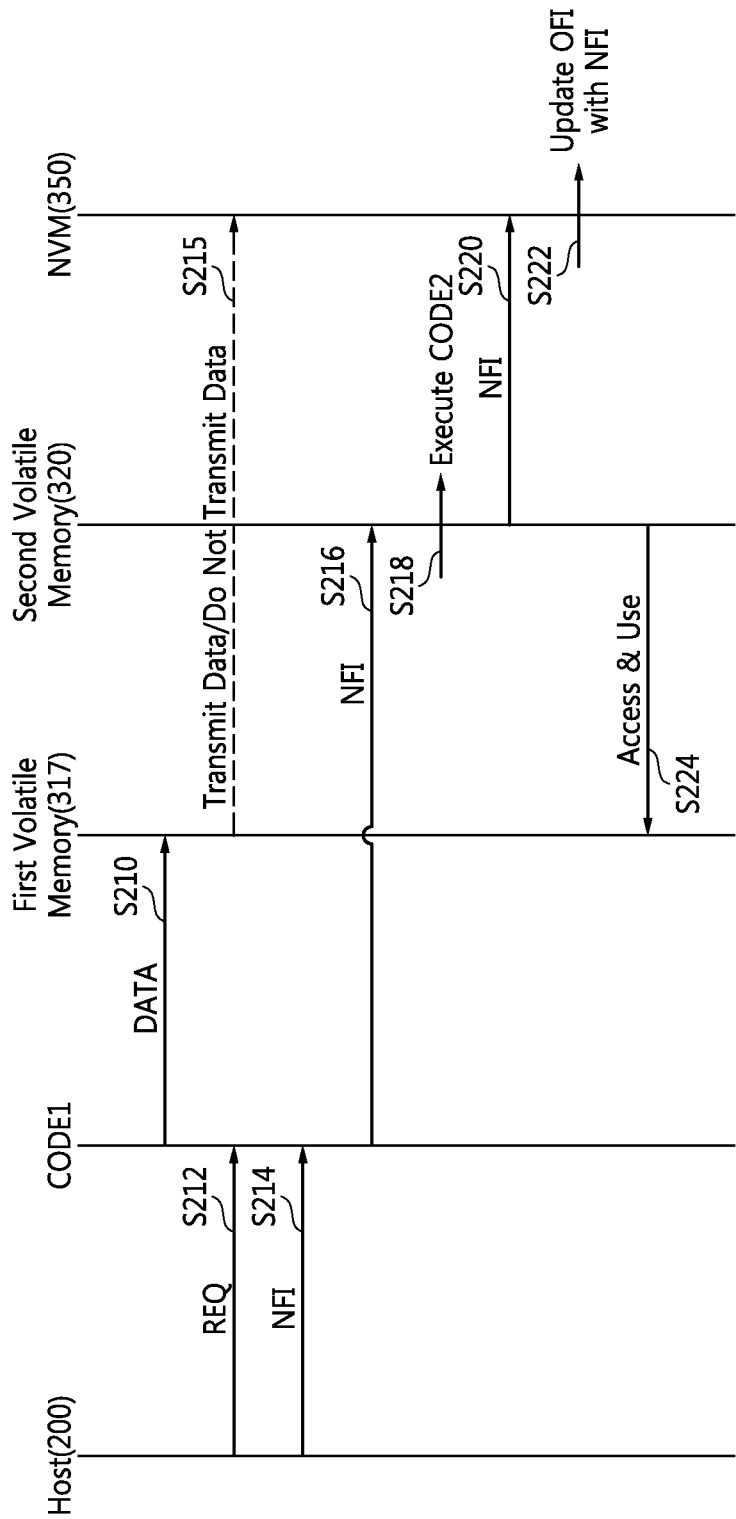
FIG. 3 is a conceptual diagram of a firmware update of the data storage device illustrated in FIG. 1 according to other embodiments of the application.

FIG. 3 is a conceptual diagram of a firmware update of the data storage device 300A illustrated in FIG. 1 according to other embodiments of the application. Referring to FIGS. 1 and 3, the current firmware image OFI may be installed in the NVM 350 and the first code CODE1 in the current firmware image OFI may be loaded to the volatile memory 317 or 320.

The first code CODE1 of the current firmware image OFI executed by the CPU 315 may generate data necessary for the operations of the data storage device 300A and the data may be stored in the first volatile memory 317 in operation S210. The data generated by the first code CODE1 may be mapping data for mapping a logical address to a physical address and/or data about an error occurring during an access operation on the NVM 350.

The first code CODE1 executed by the CPU 315 may receive a request REQ to update firmware from the host 200 through the second interface 313 in operation S212. For example, when a user inputs a command to update firmware into the host 200, the CPU 210 may generate the request REQ. The request REQ may be transmitted to the CPU 315 through the interfaces 220, 110, and 313. The CPU 315 may prepare for a firmware update in response to the request REQ.

The data storage device 300A may receive the firmware update image NFI from the host 200 through the interface 110 in operation S214. Operations S212 and S214 may be performed using FOTA, but the application is not restricted to this example. The data stored in the first volatile memory 317 may or may not be transmitted to the NVM 350 through the NVM controller 321 according to the control of the first code CODE1 executed by the CPU 315 in operation S215.

According to the control of the first code CODE1 executed by the CPU 315, the volatile memory controller 319 may store the firmware update image NFI transmitted from the host 200 in the second volatile memory 320 in operation S216. The first code CODE1 executed by the CPU 315 may execute the second code CODE2 contained in the firmware update image NFI in operation S218. For example, the first code CODE1 may jump to the second code CODE2, but the application is not restricted to this example.

The second code CODE2 executed by the first code CODE1 may store or write the firmware update image NFI to the NVM 350 in operation S220. For example, according to the control of the second code CODE2, the volatile memory controller 319 may read the firmware update image NFI from the second volatile memory 320 and transmit the firmware update image NH to the NVM controller 321. According to the control of the second code CODE2, the NVM controller 321 may write the firmware update image NFI to the NVM 350.

According to the control of the NVM controller 321, the current firmware image OFI stored in the NVM 350 may be updated with the firmware update image NFI in operation S222. When the update is completed, the second code CODE2 executed by the first code CODE1 may access and use the data stored in the first volatile memory 317 in operation S224. Various methods may be used to access the first volatile memory 317 using the second code CODE2. One of these methods will be described with reference to FIGS. 4 through 7.

For example, the second code CODE2 or the second data DATA2 accessed by the second code CODE2 may include an address (e.g., a physical address) used to access the data stored in the first volatile memory 317. Accordingly, the second code CODE2 executed by the first code CODE1 may access the data stored in the first volatile memory 317 using the address.

The data storage device 300A described with reference to FIG. 3 may omit an operation of writing the data stored in the first volatile memory 317 to the NVM 350 and an operation of loading the data from the NVM 350 to the first volatile memory 317 during the firmware update, thereby decreasing a firmware update time. When the firmware update time is decreased, a user is allowed to continuously use the data storage device 300A longer for the amount of time corresponding to the decrease in the firmware update time.

According to the embodiments illustrated in FIG. 3, the data storage device 300A may store the firmware update image NFI transmitted from the host 200 in the second volatile memory 320 according to the control of the first code CODE1 executed by the CPU 315 and may store the firmware update image NFI that has been stored in the second volatile memory 320 in the NVM 350 according to the control of the second code CODE2 executed by the first code CODE1.

Figure 4:
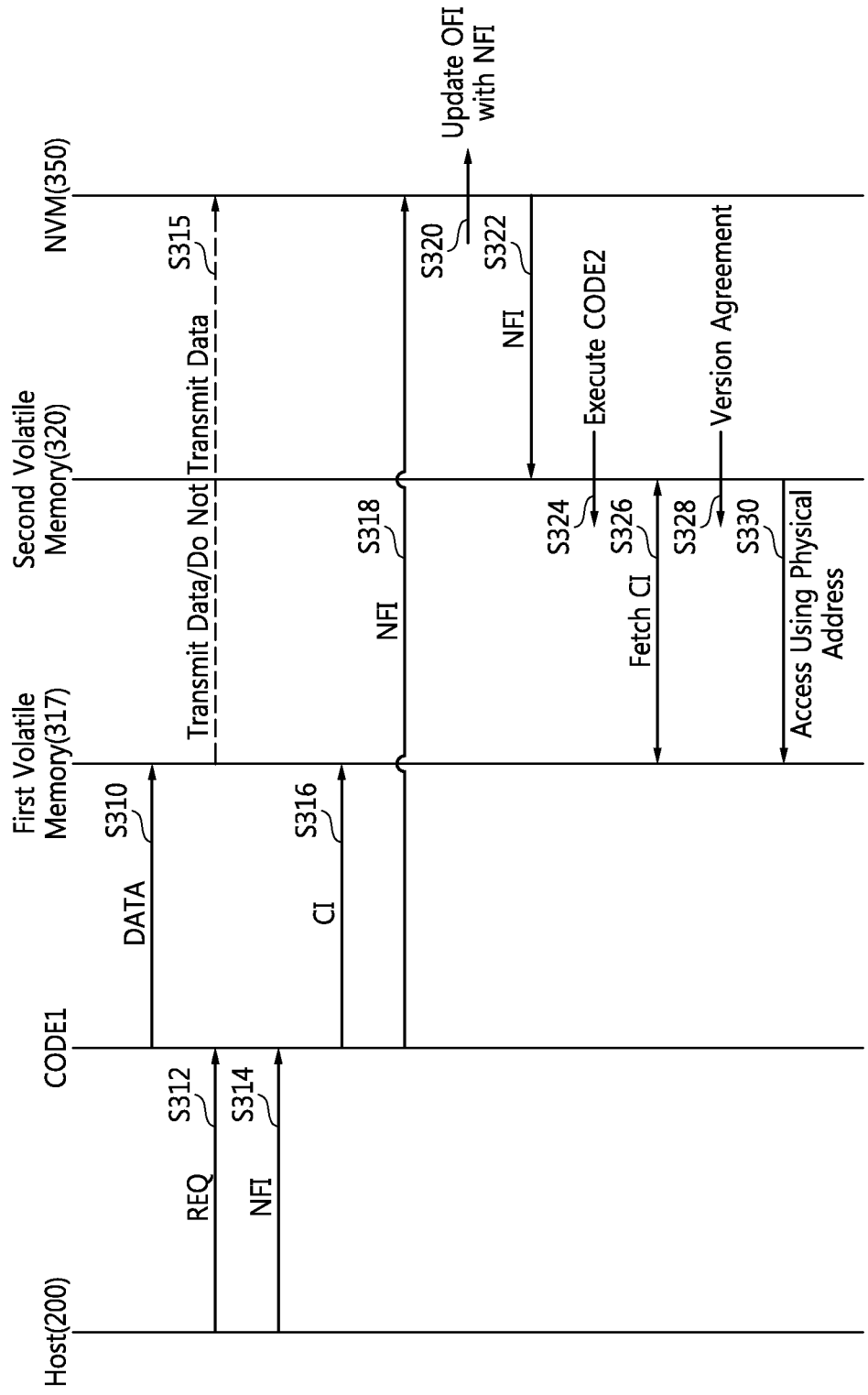
FIG. 4 is a conceptual diagram of a firmware update of the data storage device illustrated in FIG. 1 according to still other embodiments of the application.

FIG. 4 is a conceptual diagram of a firmware update of the data storage device 300A illustrated in FIG. 1 according to still other embodiments of the application. Referring to FIGS. 1 and 4, the current firmware image OFI may be installed in the NVM 350 and the first code CODE1 in the current firmware image OFI may be loaded to the volatile memory 317 or 320.

The first code CODE1 of the current firmware image OFI executed by the CPU 315 may generate data necessary for the operations of the data storage device 300A and the data may be stored in the first volatile memory 317 in operation S310. The data may be mapping data for mapping a logical address to a physical address and/or data about an error occurring during an access operation on the NVM 350, but the application is not restricted to the current embodiments.

The first code CODE1 executed by the CPU 315 may receive a request REQ to update firmware from the host 200 through the second interface 313 in operation S312. For example, when a user inputs a command to update firmware into the host 200, the CPU 210 may generate the request REQ. The request REQ may be transmitted to the CPU 315 through the interfaces 220, 110, and 313. The CPU 315 may prepare for a firmware update in response to the request REQ.

The data storage device 300A may receive the firmware update image NFI from the host 200 through the interface 110 in operation S314. Operations S312 and S314 may be performed using FOTA, but the application is not restricted to this example. The data stored in the first volatile memory 317 may or may not be transmitted to the NVM 350 through the NVM controller 321 according to the control of the first code CODE1 executed by the CPU 315 in operation S315.

When the firmware update image NFI is received, the first code CODE1 executed by the CPU 315 may generate context information CI and store the context information CI in the first volatile memory 317 in operation S316. In other embodiments, the context information CI may be stored in the second volatile memory 320. Operations S316 and S318 may be performed in parallel. The context information CI may include a meta version of the current firmware image OFI. The meta version may present a metadata structure or information about the metadata structure, but the application is not restricted to this example.

For example, the context information CI may also include a physical address of a memory region in the first volatile memory 317, in which the data has been stored, in addition to the meta version. Alternatively, when the physical address is contained in the second code CODE2 or the second data DATA2 accessed by the second code CODE2, the context information CI may include only the meta version of the current firmware image OFI. According to the control of the first code CODE1 executed by the CPU 315, the NVM controller 321 may store the firmware update image NFI transmitted from the host 200 in the NVM 350 in operation S318. Although operation S316 is performed prior to operation S318 in the embodiments illustrated in FIG. 4, operations S316 and S318 may be performed in parallel or operation S318 may be performed prior to operation S316 in other embodiments.

According to the control of the NVM controller 321, the current firmware image OFI stored in the NVM 350 may be updated with the firmware update image NFI in operation S320. The updated firmware update image NH may be loaded to the second volatile memory 320 by a bootloader executed by the first code CODE1 in operation S322. Although the updated firmware update image NFI is loaded to the second volatile memory 320 in the embodiments illustrated in FIG. 4, the updated firmware update image NFI may be loaded to the first volatile memory 317 by the bootloader in operation S322 in other embodiments. The bootloader may be stored in the volatile memory 317 or 320 or the NVM 350 and executed by the first code CODE1. The second code CODE2 contained in the firmware update image NFI loaded to the second volatile memory 317 or 320 may be executed by the first code CODE1 in operation S324.

The second code CODE2 may read or fetch the context information CI from the first volatile memory 317 in operation S326 and may compare the meta version of the current firmware image OFI contained in the context information CI with a meta version of the firmware update image NFI. The meta version of the firmware update image NFI may be stored (or contained) in the second code CODE2 or the second data DATA2 accessed by the second code CODE2.

When the meta version of the current firmware image OFI agrees with that of the firmware update image NFI or when the metadata of the current firmware image OFI is compatible with data of the firmware update image NFI in operation S328, the second code CODE2 executed by the first code CODE1 may access the data stored in the first volatile memory 317 using the physical address of the memory region in which the data is stored in the first volatile memory 317 and may use the data in operation S330. The physical address of the memory region may be contained in the context information CI, the second code CODE2, or the second data DATA2 according to embodiments.

When the data is stored in the NVM 350 in operation S315 and the meta version of the current firmware image OFI does not agree with that of the firmware update image NFI, the second code CODE2 may load the data from the NVM 350 to the first volatile memory 317 and may access and use the data loaded to the first volatile memory 317.

When the meta version of the current firmware image OFI agrees with that of the firmware update image NFI, the data storage device 300A described with reference to FIG. 4 may omit an operation of writing the data stored in the first volatile memory 317 to the NVM 350 and an operation of loading the data from the NVM 350 to the first volatile memory 317 during the firmware update, thereby decreasing a firmware update time. When the firmware update time is decreased, a user is allowed to continuously use the data storage device 300A longer for the amount of time corresponding to the decrease in the firmware update time.

Figure 5:
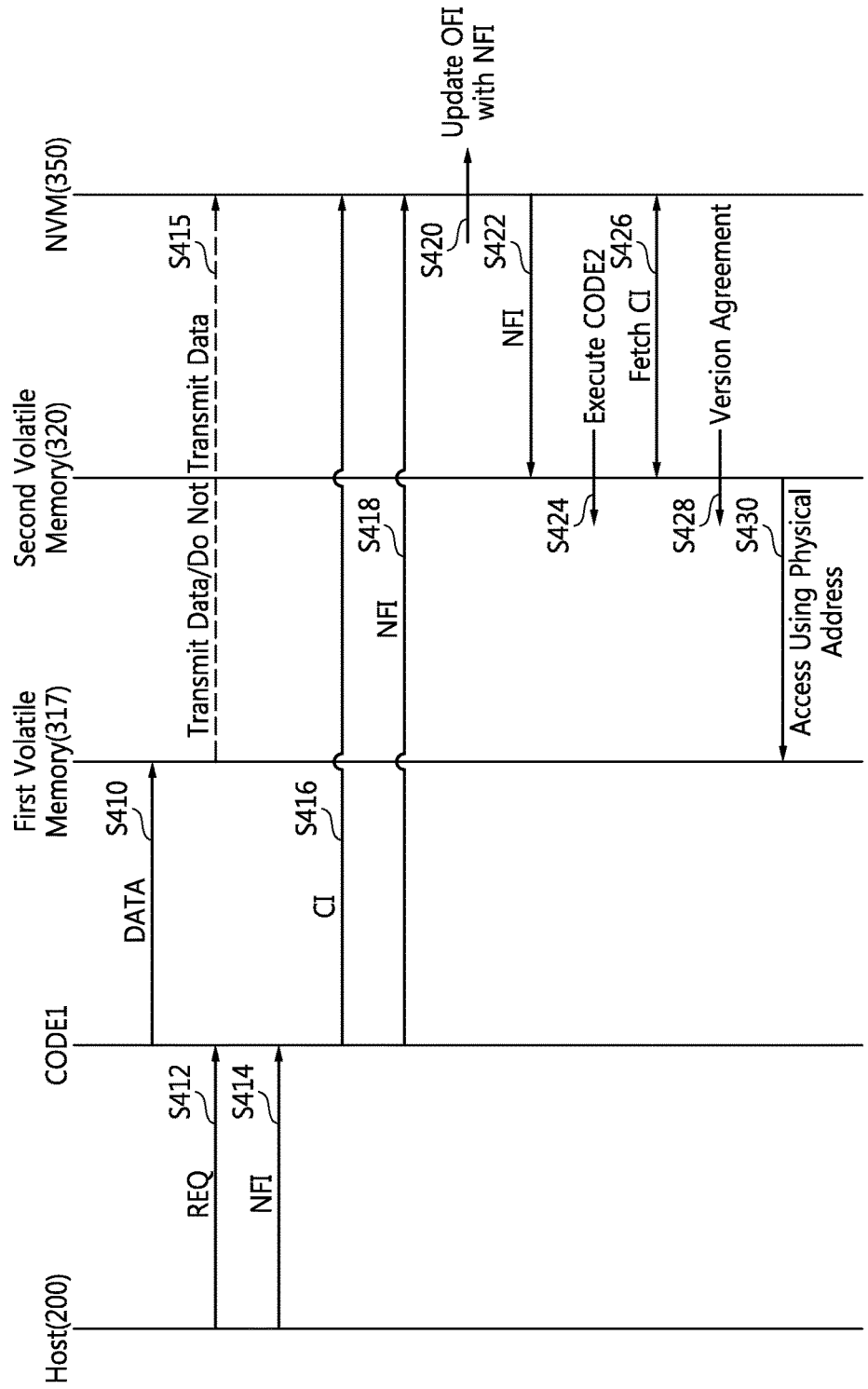
FIG. 5 is a conceptual diagram of a firmware update of the data storage device illustrated in FIG. 1 according to other embodiments of the application.

FIG. 5 is a conceptual diagram of a firmware update of the data storage device 300A illustrated in FIG. 1 according to other embodiments of the application. Referring to FIGS. 1 and 5, the current firmware image OFI may be installed in the NVM 350 and the first code CODE1 in the current firmware image OFI may be loaded to the volatile memory 317 or 320.

The first code CODE1 of the current firmware image OFI executed by the CPU 315 may generate data necessary for the operations of the data storage device 300A and the data may be stored in the first volatile memory 317 in operation S410. The data may be mapping data for mapping a logical address to a physical address and/or data about an error occurring during an access operation on the NVM 350, but the application is not restricted to the current embodiments.

The first code CODE1 executed by the CPU 315 may receive a request REQ to update firmware from the host 200 through the second interface 313 in operation S412. For example, when a user inputs a command to update firmware into the host 200, the CPU 210 may generate the request REQ. The request REQ may be transmitted to the CPU 315 through the interfaces 220, 110, and 313. The CPU 315 may prepare for a firmware update in response to the request REQ.

The data storage device 300A may receive the firmware update image NFI from the host 200 through the interface 110 in operation S414. The data stored in the first volatile memory 317 may or may not be transmitted to the NVM 350 through the NVM controller 321 according to the control of the first code CODE1 executed by the CPU 315 in operation S415.

When the firmware update image NFI is received, the first code CODE1 executed by the CPU 315 may generate context information CI and store the context information CI in the NVM 350 in operation S416. The context information CI may include a meta version of the current firmware image OFI. The meta version may present a metadata structure or information about the metadata structure. The context information CI may also include a physical address of a memory region in the first volatile memory 317, in which the data has been stored, in addition to the meta version. Alternatively, when the physical address is contained in the second code CODE2 or the second data DATA2, the context information CI may include only the meta version of the current firmware image OFI.

According to the control of the first code CODE1 executed by the CPU 315, the NVM controller 321 may store the firmware update image NFI transmitted from the host 200 in the NVM 350 in operation S418. Although operation S416 is performed prior to operation S418 in the embodiments illustrated in FIG. 5, operations S416 and S418 may be performed in parallel or operation S418 may be performed prior to operation S416 in other embodiments.

According to the control of the NVM controller 321, the current firmware image OFI stored in the NVM 350 may be updated with the firmware update image NFI in operation S420. The updated firmware update image NFI may be loaded to the second volatile memory 320 by a bootloader executed by the first code CODE1 in operation S422. Although the updated firmware update image NFI is loaded to the second volatile memory 320 in the embodiments illustrated in FIG. 5, the updated firmware update image NFI may be loaded to the first volatile memory 317 by the bootloader executed by the first code CODE1 in operation S422 in other embodiments.

According the some embodiments, the bootloader may be stored in the volatile memory 317 or 320 or the NVM 350 and executed by the first code CODE1. The second code CODE2 contained in the firmware update image NFI loaded to the second volatile memory 317 or 320 may be executed by the first code CODE1 in operation 424.

The executed second code CODE2 may read or fetch the context information CI from the first volatile memory 317 in operation S426 and may compare the meta version of the current firmware image OFI contained in the context information CI with a meta version of the firmware update image NH. The meta version (e.g., a meta structure or information about the meta structure) of the firmware update image NFI may be stored (or contained) in the second code CODE2 or the second data DATA2 accessed by the second code CODE2.

When the meta version of the current firmware image OFI agrees with that of the firmware update image NFI in operation S428, the second code CODE2 executed by the first code CODE1 may access the data stored in the first volatile memory 317 using the physical address of the memory region in which the data is stored in the first volatile memory 317 and may use the data in operation S430. The physical address of the memory region may be contained in the context information CI, the second code CODE2, or the second data DATA2 according to embodiments.

When the data is stored in the NVM 350 in operation S415 and the meta version of the current firmware image OFI does not agree with that of the firmware update image NFI, the second code CODE2 may load the data from the NVM 350 to the first volatile memory 317 and may access and use the data loaded to the first volatile memory 317.

When the meta version of the current firmware image OFI agrees with that of the firmware update image NFI, the data storage device 300A described with reference to FIG. 5 may omit an operation of writing the data stored in the first volatile memory 317 to the NVM 350 and an operation of loading the data from the NVM 350 to the first volatile memory 317 during the firmware update, thereby decreasing a firmware update time. When the firmware update time is decreased, a user is allowed to continuously use the data storage device 300A longer for the amount of time corresponding to the decrease in the firmware update time.

Figure 6:
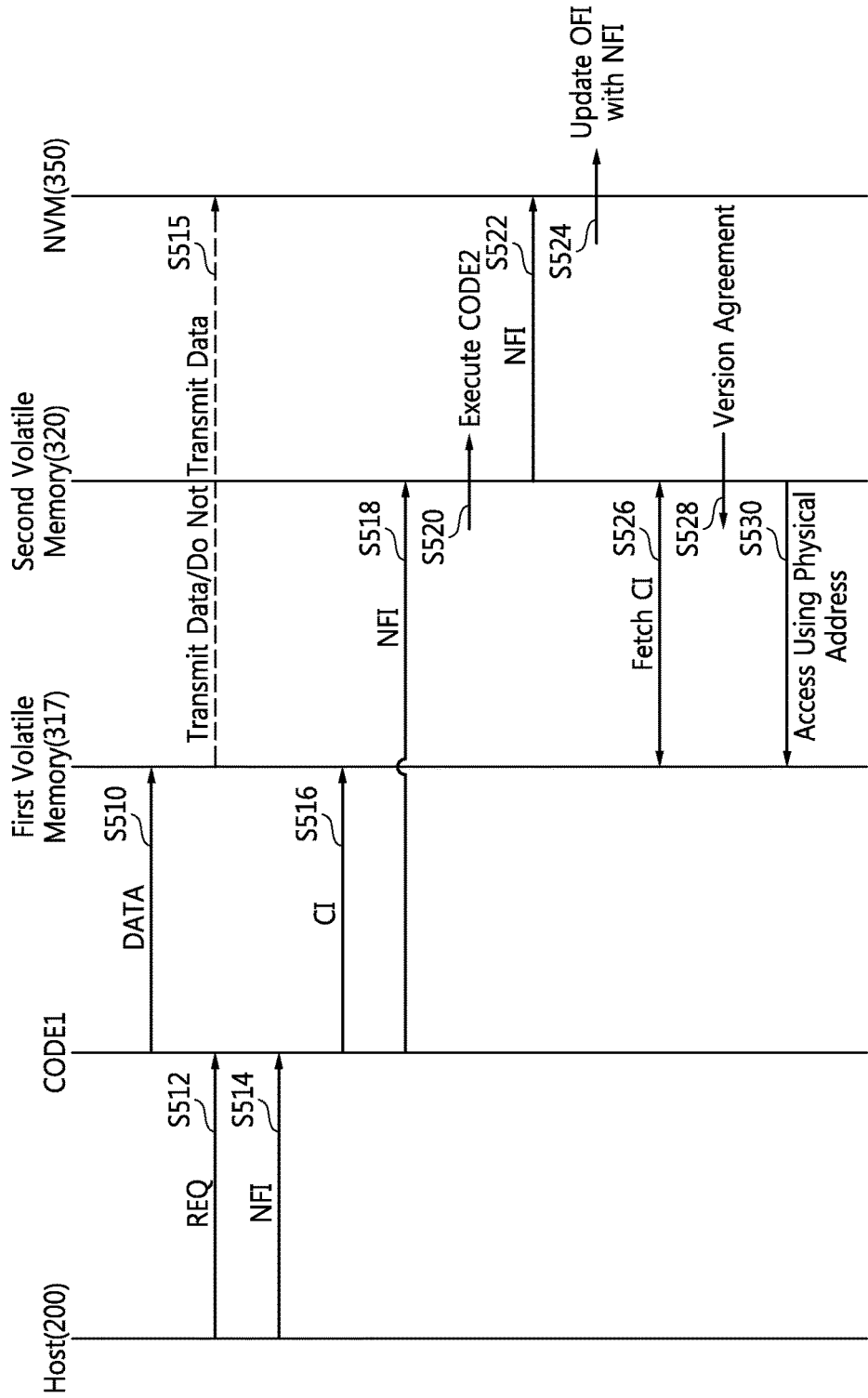
FIG. 6 is a conceptual diagram of a firmware update of the data storage device illustrated in FIG. 1 according to yet other embodiments of the application.

FIG. 6 is a conceptual diagram of a firmware update of the data storage device 300A illustrated in FIG. 1 according to yet other embodiments of the application. Referring to FIGS. 1 and 6, the current firmware image OFI may be installed in the NVM 350 and the first code CODE1 in the current firmware image OFI may be loaded to the volatile memory 317 or 320.

The first code CODE1 of the current firmware image OFI executed by the CPU 315 may generate data necessary for the operations of the data storage device 300A and the data may be stored in the first volatile memory 317 in operation S510. The data may be mapping data for mapping a logical address to a physical address and/or data about an error occurring during an access operation on the NVM 350, but the application is not restricted to the current embodiments.

The first code CODE1 executed by the CPU 315 may receive a request REQ to update firmware from the host 200 through the second interface 313 in operation S512. For example, when a user inputs a command to update firmware into the host 200, the CPU 210 may generate the request REQ. The request REQ may be transmitted to the CPU 315 through the interfaces 220, 110, and 313. The CPU 315 may prepare for a firmware update in response to the request REQ.

The data storage device 300A may receive the firmware update image NFI from the host 200 through the interface 110 in operation S514. The data stored in the first volatile memory 317 may or may not be transmitted to the NVM 350 through the NVM controller 321 according to the control of the first code CODE1 executed by the CPU 315 in operation S515.

When the firmware update image NFI is received, the first code CODE1 executed by the CPU 315 may generate context information CI and store the context information CI in the first volatile memory 317 in operation S516. The context information CI may include a meta version of the current firmware image OFI. The meta version may present a metadata structure. The context information CI may also include a physical address of a memory region in the first volatile memory 317, in which the data has been stored, in addition to the meta version. Alternatively, when the physical address is contained in the second code CODE2 or the second data DATA2, the context information CI may include only the meta version of the current firmware image OFI.

According to the control of the first code CODE1 executed by the CPU 315, the volatile memory controller 329 may store the firmware update image NFI transmitted from the host 200 in the second volatile memory 320 in operation S518. The first code CODE1 executed by the CPU 315 may execute the second code CODE2 contained in the firmware update image NFI in operation S520.

The second code CODE2 executed by the first code CODE1 may store the firmware update image NFI in the NVM 350 in operation S522. For example, according to the second code CODE2, the volatile memory controller 319 may read the firmware update image NFI from the second volatile memory 320 and transmit the firmware update image NFI to the NVM controller 321. According to the control of the second code CODE2, the NVM controller 321 may write the firmware update image NFI to the NVM 350.

Although operation S516 is performed prior to operation S518 in the embodiments illustrated in FIG. 6, operations S516 and S518 may be performed in parallel or operation S518 may be performed prior to operation S516 in other embodiments. According to the control of the NVM controller 321, the current firmware image OFI stored in the NVM 350 may be updated with the firmware update image NFI in operation S524.

The second code CODE2 executed by the first code CODE1 may read or fetch the context information CI from the first volatile memory 317 in operation S526 and may compare the meta version of the current firmware image OFI contained in the context information CI with a meta version of the firmware update image NFI. The meta version (e.g. a metadata structure or information about the metadata structure) of the firmware update image NFI may be stored (or contained) in the second code CODE2 or the second data DATA2 accessed by the second code CODE2.

When the meta version of the current firmware image OFI agrees with that of the firmware update image NFI in operation S528, the second code CODE2 executed by the first code CODE1 may access the data stored in the first volatile memory 317 using the physical address of the memory region in which the data is stored in the first volatile memory 317 and may use the data in operation S530. The physical address of the memory region may be contained in the context information CI, the second code CODE2, or the second data DATA2 according to embodiments.

When the data is stored in the NVM 350 in operation S515 and the meta version of the current firmware image OFI does not agree with that of the firmware update image NFI, the second code CODE2 may load the data from the NVM 350 to the first volatile memory 317 and may access and use the data loaded to the first volatile memory 317.

When the meta version of the current firmware image OFI agrees with that of the firmware update image NFI, the data storage device 300A described with reference to FIG. 6 may omit an operation of writing the data stored in the first volatile memory 317 to the NVM 350 and an operation of loading the data from the NVM 350 to the first volatile memory 317 during the firmware update, thereby decreasing a firmware update time. When the firmware update time is decreased, a user is allowed to continuously use the data storage device 300A longer for the amount of time corresponding to the decrease in the firmware update time.

Figure 7:
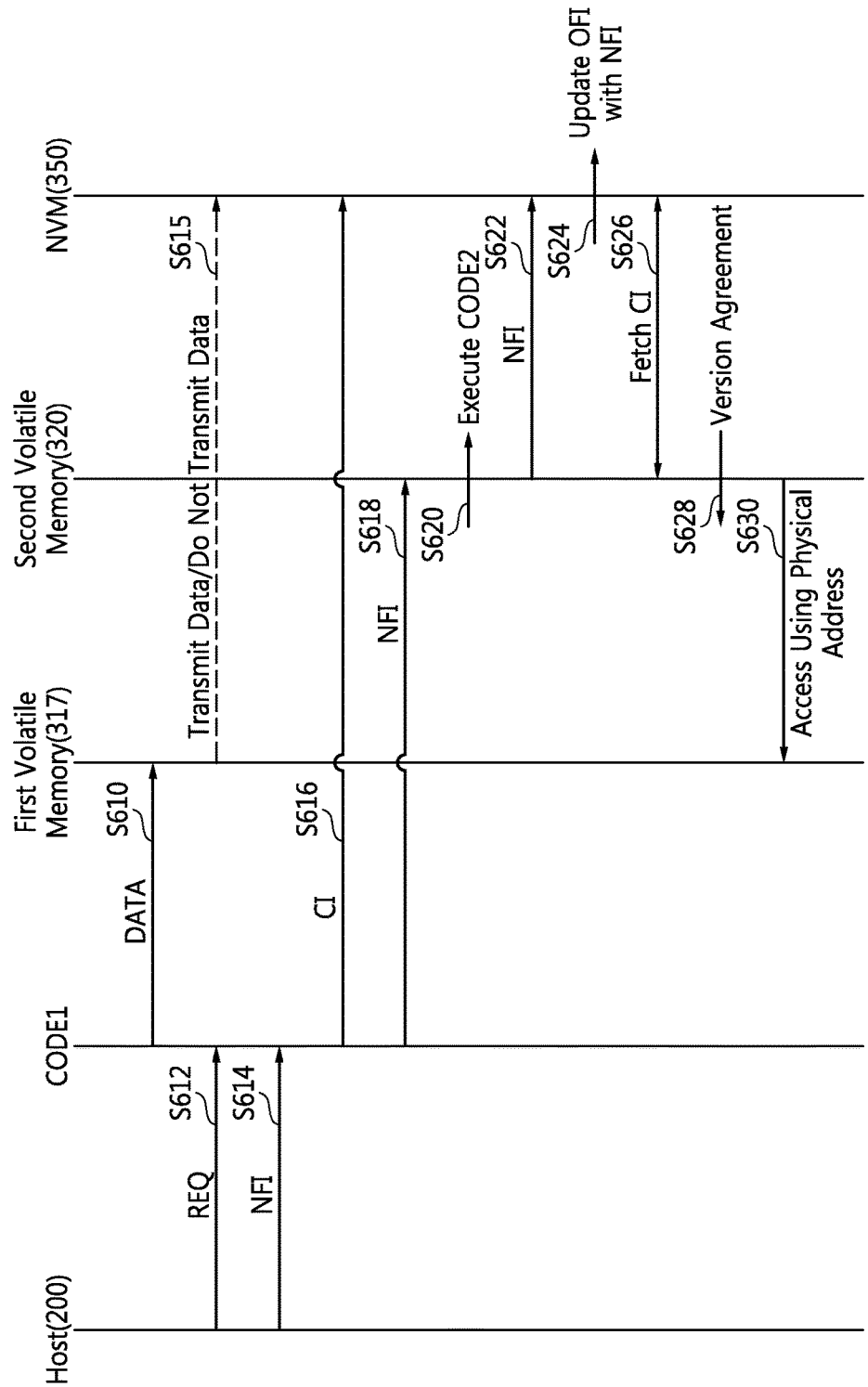
FIG. 7 is a conceptual diagram of a firmware update of the data storage device illustrated in FIG. 1 according to further embodiments of the application.

FIG. 7 is a conceptual diagram of a firmware update of the data storage device 300A illustrated in FIG. 1 according to further embodiments of the application. Referring to FIGS. 1 and 7, the current firmware image OFI may be installed in the NVM 350 and the first code CODE1 in the current firmware image OFI may be loaded to the volatile memory 317 or 320.

The first code CODE1 of the current firmware image OFI executed by the CPU 315 may generate data necessary for the operations of the data storage device 300A and the data may be stored in the first volatile memory 317 in operation S610. The data may be mapping data for mapping a logical address to a physical address and/or data about an error occurring during an access operation on the NVM 350, but the application is not restricted to the current embodiments.

The first code CODE1 executed by the CPU 315 may receive a request REQ to update firmware from the host 200 through the second interface 313 in operation S612. For example, when a user inputs a command to update firmware into the host 200, the CPU 210 may generate the request REQ. The request REQ may be transmitted to the CPU 315 through the interfaces 220, 110, and 313. The CPU 315 may prepare for a firmware update in response to the request REQ.

The data storage device 300A may receive the firmware update image NFI from the host 200 through the interface 110 in operation S614. The data stored in the first volatile memory 317 may or may not be transmitted to the NVM 350 through the NVM controller 321 according to the control of the first code CODE1 executed by the CPU 315 in operation S615.

When the firmware update image NFI is received, the first code CODE1 executed by the CPU 315 may generate context information CI and store the context information CI in the NVM 350 in operation S616. The context information CI may include a meta version of the current firmware image OFI. The meta version may present a metadata structure. The context information CI may also include a physical address of a memory region in the first volatile memory 317, in which the data has been stored, in addition to the meta version. Alternatively, when the physical address is contained in the second code CODE2 or the second data DATA2, the context information CI may include only the meta version of the current firmware image OFI.

According to the control of the first code CODE1 executed by the CPU 315, the volatile memory controller 329 may store the firmware update image NFI transmitted from the host 200 in the second volatile memory 320 in operation S618. The first code CODE1 executed by the CPU 315 may execute the second code CODE2 contained in the firmware update image NFI in operation S620.

The second code CODE2 executed by the first code CODE1 may store the firmware update image NFI in the NVM 350 in operation S622. For example, according to the second code CODE2, the volatile memory controller 319 may read the firmware update image NFI from the second volatile memory 320 and transmit the firmware update image NFI to the NVM controller 321. According to the control of the second code CODE2, the NVM controller 321 may write the firmware update image NFI to the NVM 350.

Although operation S616 is performed prior to operation S618 in the embodiments illustrated in FIG. 7, operations S616 and S618 may be performed in parallel or operation S618 may be performed prior to operation S616 in other embodiments. According to the control of the NVM controller 321, the current firmware image OFI stored in the NVM 350 may be updated with the firmware update image NFI in operation S624.

The second code CODE2 executed by the first code CODE1 may read or fetch the context information CI from the NVM 350 in operation S626 and may compare the meta version of the current firmware image OFI contained in the context information CI with a meta version of the firmware update image NFI. The meta version (e.g. a metadata structure or information about the metadata structure) of the firmware update image NFI may be stored (or contained) in the second code CODE2 or the second data DATA2 accessed by the second code CODE2.

When the meta version of the current firmware image OFI agrees with that of the firmware update image NFI in operation S628, the second code CODE2 executed by the first code CODE1 may access the data stored in the first volatile memory 317 using the physical address of the memory region in which the data is stored in the first volatile memory 317 and may use the data in operation S630. The physical address of the memory region may be contained in the context information CI, the second code CODE2, or the second data DATA2 according to embodiments.

When the data is stored in the NVM 350 in operation S615 and the meta version of the current firmware image OFI does not agree with that of the firmware update image NFI, the second code CODE2 may load the data from the NVM 350 to the first volatile memory 317 and may access and use the data loaded to the first volatile memory 317.

When the meta version of the current firmware image OFI agrees with that of the firmware update image NFI, the data storage device 300A described with reference to FIG. 7 may omit an operation of writing the data stored in the first volatile memory 317 to the NVM 350 and an operation of loading the data from the NVM 350 to the first volatile memory 317 during the firmware update, thereby decreasing a firmware update time. When the firmware update time is decreased, a user is allowed to continuously use the data storage device 300A longer for the amount of time corresponding to the decrease in the firmware update time.

Figure 8:
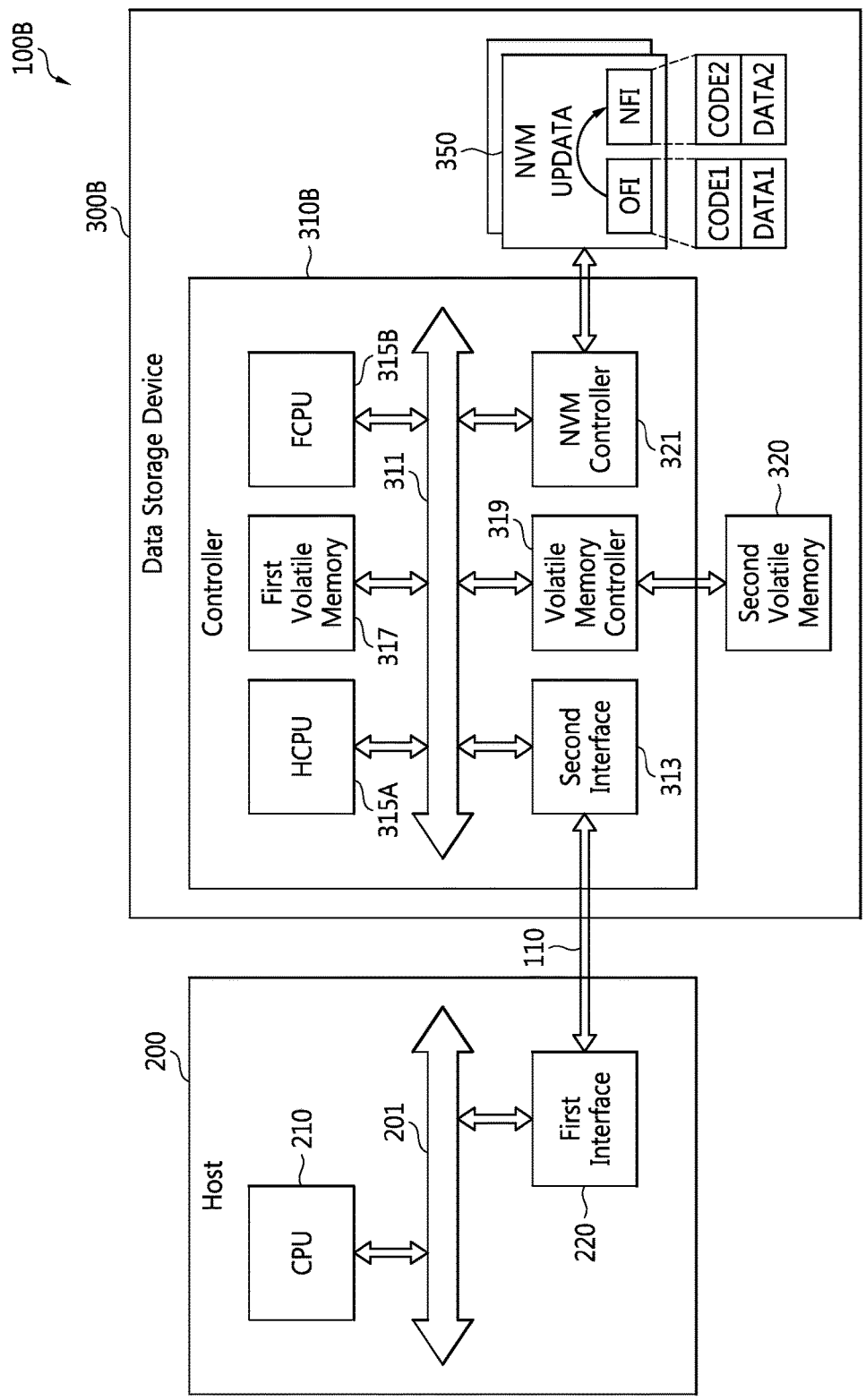
FIG. 8 is a block diagram of a data processing system according to other embodiments of the application.

FIG. 8 is a block diagram of a data processing system 100B according to other embodiments of the application. The data processing system 100B may include the host 200 and a data storage device 300B, which are connected with each other via the interface 110. The data storage device 300B may include a controller 310B, the second volatile memory 320, and the NVM 350. The controller 310B may include the second interface 313, a first CPU 315A, a second CPU 315B, the first volatile memory 317, the volatile memory controller 319, and the NVM controller 321.

The first CPU 315A may control the interactive operations between the host 200 and the controller 310B and the second CPU 315B may control the interactive operations between the controller 310B and the NVM 350. The first CPU 315A may control the operations of the second interface 313 and the second CPU 315B may control the operations of the NVM controller 321.

Figure 9:
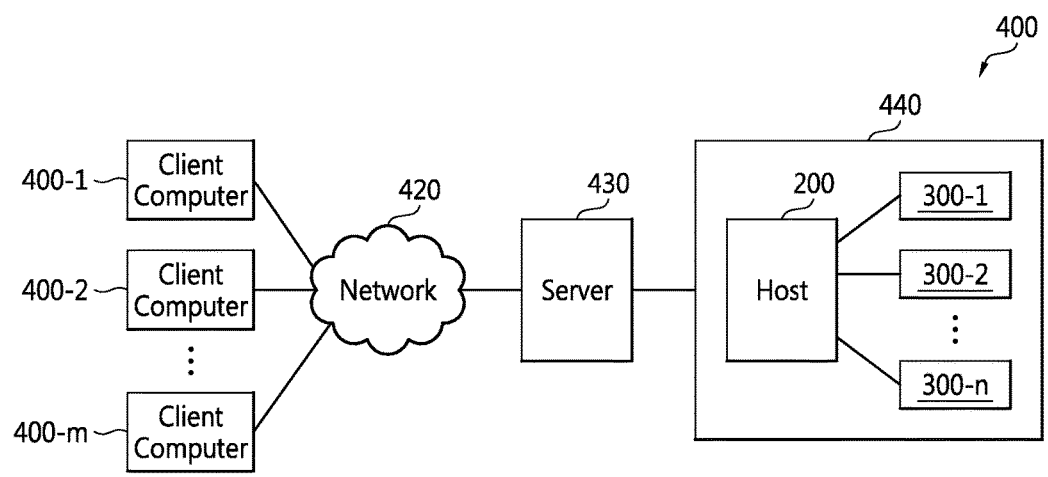
FIG. 9 is a schematic block diagram of a data center including the data processing system illustrated in FIG. 1.

FIG. 9 is a schematic block diagram of a data center 400 including the data processing system 100A illustrated in FIG. 1. Referring to FIGS. 1 through 9, the data center (or an internet data center) 400 may include a plurality of client computers 400-1 through 400-$m$ (where "m" is a natural number), a network 420, a server 430, and a data processing system 440. The data center 400 may be implemented as a system which can provide internet portal services or web portal services.

The client computers 400-1 through 400-$m$ may be connected with the server (or web server) 430 via the network 420. The network 420 may be a wireless internet, a wired internet, or a network supporting Wi-Fi.

The server 430 may be connected with the data processing system 440 through a network. The data processing system 440 may include the host 200 and a plurality of data storage devices 300-1 through 300-$n$ (where "n" is a natural number). The structure and operations of each of the data storage devices 300-1 through 300-$n$ are substantially the same as or similar to those of the data storage device 300A or 300B described with reference to FIGS. 1 through 8. Thus, descriptions of the data storage devices 300-1 through 300-$n$ will be omitted.

The server 430 and the host 200 may be implemented in a single server or host. At this time, the server or the host may communicate data with the data storage devices 300-1 through 300-$n$ through an interface appropriate for transmission control protocol/internet protocol (TCP/IP) or Ethernet.

Operations described in the embodiments illustrated in FIGS. 2 through 7 are provided to explain operations performed in the data storage device 300A and are not intended to denote the processing order. Accordingly, at least two of the operations in some embodiments may be performed simultaneously or in parallel. Although a first operation is performed prior to a second operation in some embodiments, the second operation may be performed prior to the first operation and the first and second operations may be performed in simultaneously or in parallel in other embodiments.

As described above, according to some embodiments of the application, a data storage device stores data, which is related with the operations of the data storage device and is generated by a first code of a current firmware image, in volatile memory and allows a second code of a firmware update to access and use the data in the volatile memory, thereby decreasing firmware update time. When the firmware update time is decreased, a user of the data storage device is allowed to continuously use the data storage device longer for the amount of time corresponding to the decrease in the firmware update time.

While the application has been particularly shown and described with reference to exemplary embodiments thereof, it will be understood by those of ordinary skill in the art that various changes in forms and details may be made therein without departing from the spirit and scope of the application as defined by the following claims.

What is claimed is:

1. A data storage device comprising:
   a non-volatile memory configured to store a firmware update image which will replace a current firmware image;
   a first volatile memory; and
   a processor configured to control an operation of the non-volatile memory and an operation of the first volatile memory, wherein:
   when a first code included in the current firmware image is executed by the processor, the first code generates data for an operation of the data storage device and then directly stores the data generated by the first code in the first volatile memory;
   when a second code included in the firmware update image is executed by the first code, the second code accesses the data that has been stored in the first volatile memory and controls the operation of the data storage device using the data; and
   the data comprises mapping data for mapping a logical address to a physical address or data about an error occurring during an access operation on the non-volatile memory.

2. The data storage device of claim 1, wherein the first code transmits the data stored in the first volatile memory to the non-volatile memory.

3. The data storage device of claim 1, wherein the first code does not transmit the data stored in the first volatile memory to the non-volatile memory.

4. The data storage device of claim 1, wherein the first code stores the firmware update image in the non-volatile memory to update the current firmware image with the firmware update image.

5. The data storage device of claim 1, wherein:
the first code stores the firmware update image in a second volatile memory; and
when the second code stored in the second volatile memory is executed by the first code, the second code stores the firmware update image, which has been stored in the second volatile memory, in the non-volatile memory to update the current firmware image with the firmware update image.

6. The data storage device of claim 1, wherein:
when the firmware update image is received, the first code generates context information and stores the context information in the first volatile memory and the second code accesses the data stored in the first volatile memory using the context information stored in the first volatile memory and uses the data, and
the context information comprises a first meta version of the current firmware image; and a physical address of a memory region storing the data in the first volatile memory is included in one among the context information, the second code, and second data accessed by the second code.

7. The data storage device of claim 6, wherein:
the second code compares the first meta version of the current firmware image with a second meta version of the firmware update image; and
when the first meta version agrees with the second meta version, the second code accesses the data stored in the memory region using the physical address and uses the data.

8. The data storage device of claim 1, wherein:
when the firmware update image is received, the first code generates context information and stores the context information in the non-volatile memory and the second code loads the context information from the non-volatile memory to the first volatile memory, accesses the data using the context information, and uses the data,
the context information comprises a first meta version of the current firmware image; and a physical address of a memory region storing the data in the first volatile memory is included in one among the context information, the second code, and second data accessed by the second code.

9. The data storage device of claim 1, wherein the first volatile memory is random access memory (RAM) and the non-volatile memory is flash-based memory.

10. A method of updating firmware in a data storage device, the method comprising:
generating data for an operation of the data storage device and then directly storing the generated data in a first volatile memory, using a first code included in a current firmware image being executed in the data storage device;
receiving a firmware update image;
updating the current firmware image with the firmware update image;
accessing the data stored in the first volatile memory using a second code included in the firmware update image when the second code is executed by the first code; and
controlling the operation of the data storage device using the second code and the data accessed by the second code, wherein
the data maps a logical memory address to a physical memory address or is information of an error occurring in a non-volatile memory access.

11. The method of claim 10, wherein the updating comprises storing the firmware update image, which has been received, in a non-volatile memory using the first code to enable the current firmware image to be updated with the firmware update image.

12. The method of claim 10, wherein the updating comprises:
storing the firmware update image in a second volatile memory using the first code; and
storing the firmware update image, which has been stored in the second volatile memory, in a non-volatile memory using the second code executed by the first code.

13. A method, executed by a processor, of updating firmware in a data storage device, the method comprising:
generating, by execution of a first program instruction of a current firmware image, data for operation of the data storage device and then directly storing the data generated in a volatile memory;
updating the current firmware image with an update firmware image;
accessing, by execution of a second program instruction of the update firmware image, the data stored in the volatile memory; and
controlling, by the execution of second program instruction of the update firmware image, the operation of the data storage device using the data accessed, wherein:
the execution of the second program instruction is performed by the execution of the first program instruction, and
the data maps a logical memory address to a physical memory address or is information of an error occurring in a non-volatile memory access by the processor.

14. The method of claim 13, further comprising:
generating, by execution of the first program instruction, a first meta version of the current firmware image, and determining whether the second program instruction may access the data based upon an outcome of comparing the first meta version and a second meta version of the update firmware image.

15. The method of claim 14, wherein the processor acquires the first meta version from the volatile memory by execution of the second program instruction.

16. The method of claim 14, wherein the second program instruction causes the processor to acquire the first meta version from a nonvolatile memory.

17. The method of claim 13, further comprising accessing the data while updating the current firmware image with the update firmware image.

* * * * *